(12) United States Patent
Bishop et al.

(10) Patent No.: US 10,906,080 B2
(45) Date of Patent: Feb. 2, 2021

(54) SYSTEM AND METHODS TO RADIALLY ORIENT EXTRUDED TUBING FOR VEHICLE BODY COMPONENT

(71) Applicant: Ford Motor Company, Dearborn, MI (US)

(72) Inventors: Frank J. Bishop, Wales, MI (US); Stephen Kernosky, Livonia, MI (US); James Engle, Chesterfield, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 295 days.

(21) Appl. No.: 15/953,638

(22) Filed: Apr. 16, 2018

(65) Prior Publication Data

US 2019/0314882 A1 Oct. 17, 2019

(51) Int. Cl.
*B21D 26/033* (2011.01)
*G01B 11/12* (2006.01)
*B21D 53/88* (2006.01)

(52) U.S. Cl.
CPC ............ *B21D 26/033* (2013.01); *G01B 11/12* (2013.01); *B21D 53/88* (2013.01)

(58) Field of Classification Search
CPC ...... B21D 26/033; B21D 53/88; G01B 11/12; G01B 11/24; G01B 11/272
USPC .................................................. 356/600–640
See application file for complete search history.

(56) References Cited

U.S. PATENT DOCUMENTS

| | | |
|---|---|---|
| 2,077,454 A | 4/1937 | Almdale |
| 2,157,564 A | 5/1939 | Peuthert |
| 3,970,113 A | 7/1976 | Güttinger et al. |
| 3,972,432 A | 8/1976 | Mori et al. |
| 4,248,179 A | 2/1981 | Bonner |
| 4,838,063 A | 6/1989 | Nishiyama et al. |
| 4,967,583 A | 11/1990 | Watanabe et al. |
| 5,388,329 A | 2/1995 | Randlett et al. |
| 5,595,085 A | 1/1997 | Chen |
| 5,730,189 A | 3/1998 | Randlett et al. |
| 5,890,387 A | 4/1999 | Roper et al. |
| 6,161,989 A | 12/2000 | Kotani et al. |
| 6,270,245 B1 | 8/2001 | Bruyas et al. |
| 6,279,369 B1 | 8/2001 | Kasuya |
| 6,629,632 B1 | 10/2003 | Jack et al. |
| 6,764,559 B2 | 7/2004 | Li et al. |
| 7,657,082 B2 | 2/2010 | Kubo et al. |
| 7,690,260 B2 | 4/2010 | Panyard et al. |
| 8,104,318 B2 | 1/2012 | Hiramoto et al. |
| 9,217,731 B2 | 12/2015 | Yamamoto et al. |
| 9,533,343 B2 * | 1/2017 | May .................... B21C 37/08 |
| 9,816,943 B2 | 11/2017 | Reiz |

(Continued)

FOREIGN PATENT DOCUMENTS

| | | |
|---|---|---|
| CN | 103949749 A | 7/2014 |
| CN | 203857148 U | 10/2014 |

(Continued)

*Primary Examiner* — Tri T Ton
(74) *Attorney, Agent, or Firm* — Vincent Mastrogiacomo; Brooks Kushman P.C.

(57) ABSTRACT

A method of orienting a weld seam in an aluminum vehicle body tube is provided. The method may include measuring a periphery of a first end of the tube to locate a position of a pip disposed on a wall of the first end of the tube and rotating the tube so that the weld seam is positioned in a predetermined location suitable for tube forming.

5 Claims, 5 Drawing Sheets

(56) References Cited

U.S. PATENT DOCUMENTS

| | | |
|---|---|---|
| 10,357,817 B2 | 7/2019 | May et al. |
| 2002/0023346 A1 | 2/2002 | Butler |
| 2002/0100517 A1 | 8/2002 | Somerville et al. |
| 2003/0163918 A1 | 9/2003 | Yoshitoshi et al. |
| 2010/0086710 A1 | 4/2010 | Engelmeyer |
| 2011/0174046 A1 | 7/2011 | Beissel et al. |
| 2017/0182605 A1* | 6/2017 | Rajagopalan ........ B23K 9/0282 |

FOREIGN PATENT DOCUMENTS

| | | |
|---|---|---|
| JP | H08323477 A | 12/1996 |
| JP | H10166036 A | 6/1998 |
| JP | H10166085 A | 6/1998 |
| JP | 2009214172 A | 9/2009 |
| JP | 2009279601 A | 12/2009 |
| JP | 5972188 B2 | 8/2016 |
| KR | 20110053075 A | 5/2011 |
| KR | 101336287 B1 | 12/2013 |
| KR | 101403412 B1 | 6/2014 |
| WO | 2012157768 A1 | 11/2012 |

\* cited by examiner

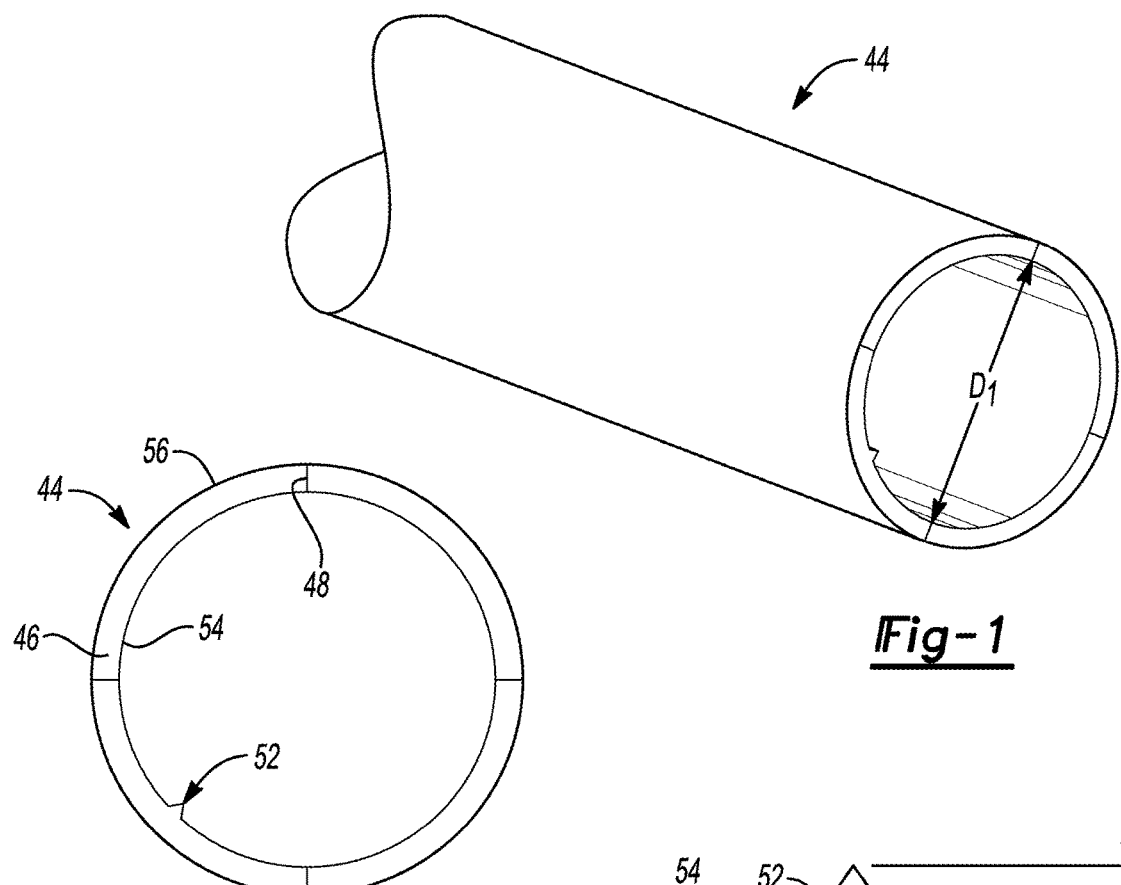
Fig-1
Fig-1A
Fig-1B
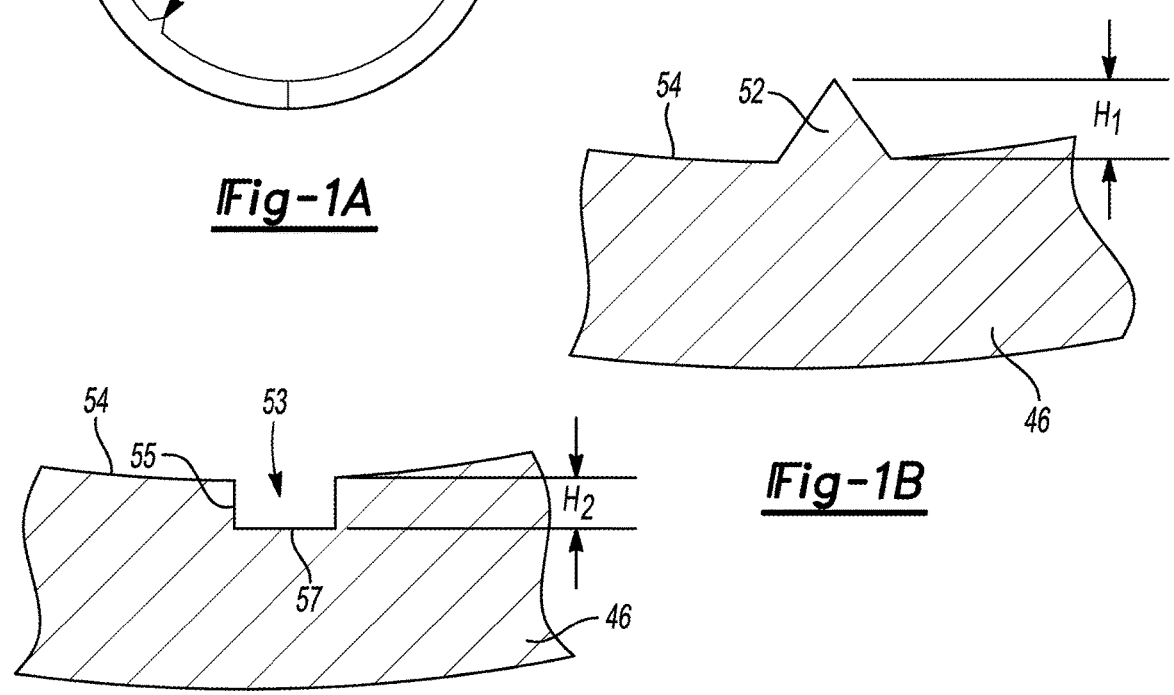
Fig-1C

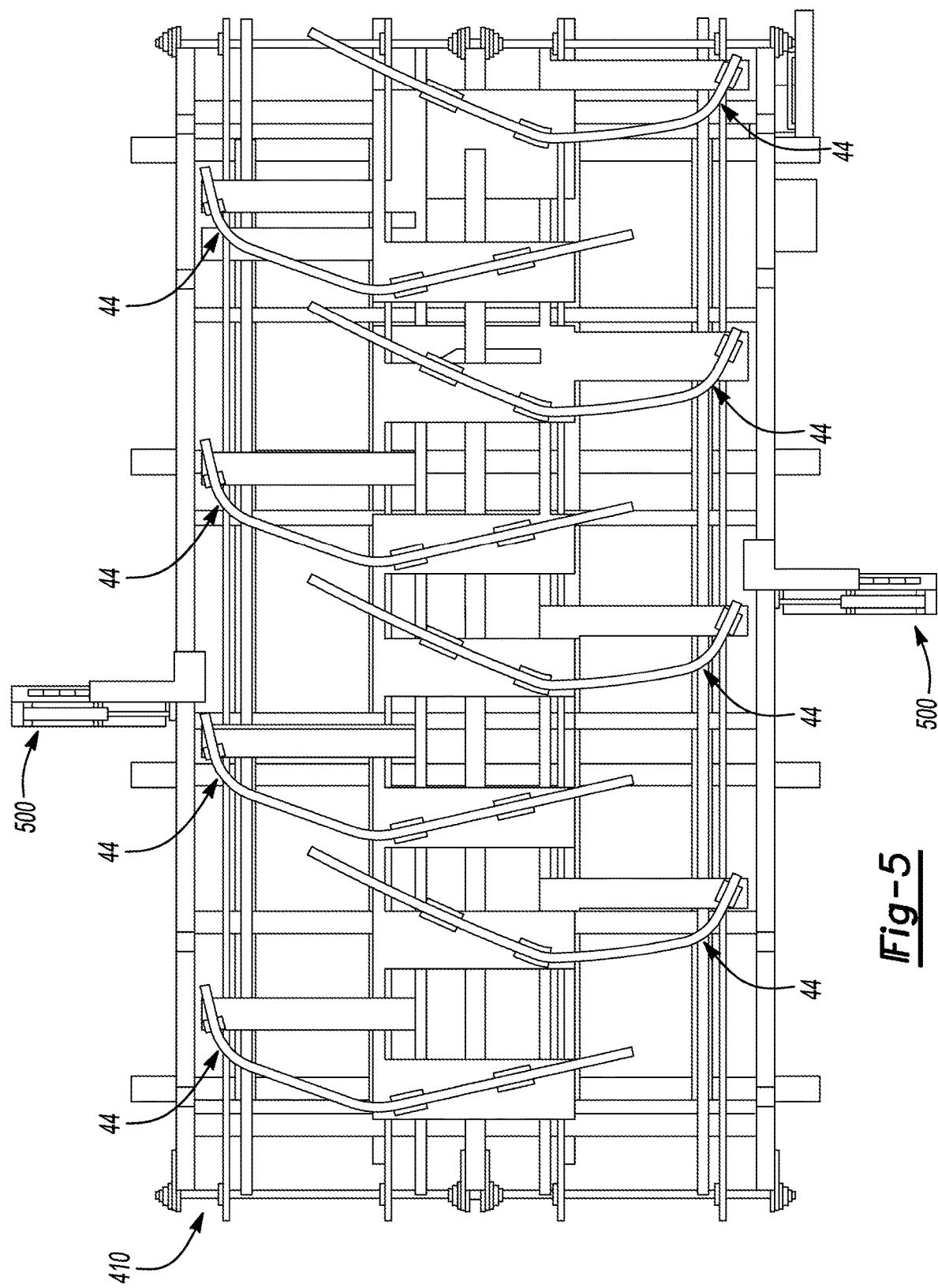

SYSTEM AND METHODS TO RADIALLY ORIENT EXTRUDED TUBING FOR VEHICLE BODY COMPONENT

TECHNICAL FIELD

The present disclosure relates to extruded tubing for automotive applications.

BACKGROUND

Vehicle manufacturers are implementing lighter, stronger materials such as aluminum alloys, to meet emission reduction goals, meet fuel economy goals, reduce manufacturing costs, and reduce vehicle weight. Increasingly stringent safety requirements must be met while reducing vehicle weight. One approach to meeting these competing objectives is to hydro-form high strength aluminum alloy tubular blanks into strong, lightweight hydro-formed parts.

Structural (port hole) tubes are formed by extruding an aluminum billet through an extrusion die at a high temperature and at high pressure. Discontinuous material flow across the section of the shape occurs when the flowing aluminum separates in the mandrel plate and re-converges in the cap section. A weld line, or joining line, is created where the flowing aluminum re-converges to form the extruded shape. Structural tubes may have two or more weld lines that are an artifact of the porthole extrusion process.

The extruded structural tubes may be bent or pre-formed prior to the hydroforming process. The radial position of the weld lines must be controlled and verified throughout this process.

SUMMARY

According to one embodiment of this disclosure, a method of orienting a weld seam in an aluminum vehicle body tube is provided. The method may include measuring a profile of an inner periphery at a first end of the tube to locate a first position of a pip disposed on a wall of the tube. The method may also include rotating the tube so that the weld seam is positioned in a predetermined location suitable for tube forming.

According to another embodiment of this disclosure, a method of hydroforming an extruded circular tube is provided. The method may include measuring an inner periphery of first and second ends of the tube to identify first and second circumferential positions of a pip disposed on a wall at each end of the tube. The method may also include comparing a positional difference between the first and second circumferential positions against a predetermined threshold.

According to yet another embodiment of this disclosure, a method of forming a circular tube is provided. The method may include measuring, by a laser displacement sensor, profiles of peripheral surfaces of each end of the tube to identify first and second circumferential positions of a pip on each end of the tube. The method may also include rotating the tube so that a weld seam, positioned relative to the first and second circumferential positions, is positioned in a predetermined location suitable for tube forming.

BRIEF DESCRIPTION OF THE DRAWINGS

FIG. 1 is a partial-perspective view of a circular porthole extruded alloy tube.

FIG. 1A is a front view of the circular porthole extruded alloy tube.

FIG. 1B is a detail view of a pip feature on the tube according to a first embodiment of this disclosure.

FIG. 1C is a detail view of a pip feature on the tube according to another embodiment of this disclosure.

FIG. 5 is a top-view of verifying the positions of a pip disposed on formed tubes.

DETAILED DESCRIPTION

Figure 2:
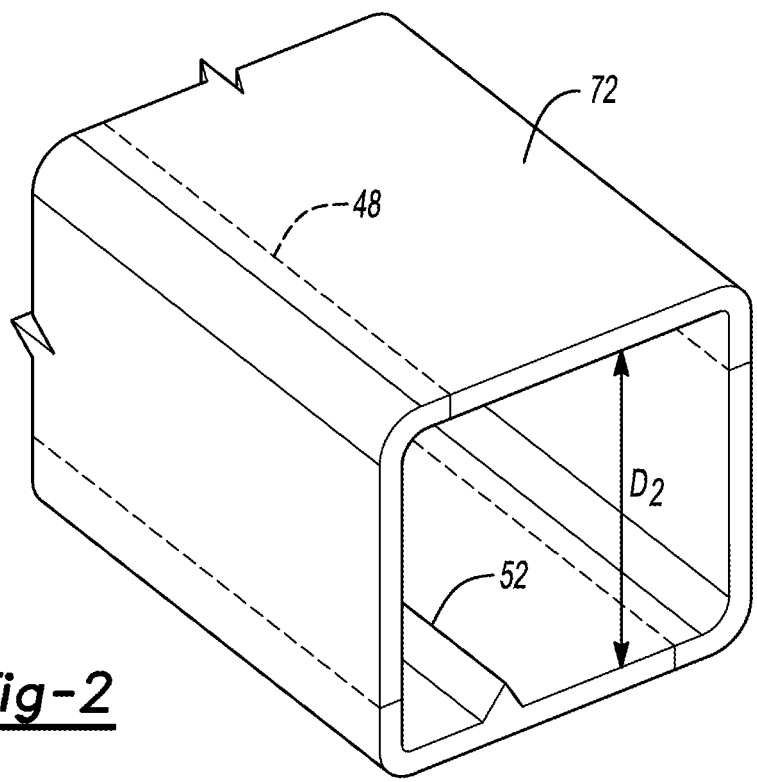
FIG. 2 is a partial-perspective view of a rectangular porthole extruded alloy tube.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, an extruded tube, such as an aluminum-alloy-porthole-extruded structural tube 44 is shown. The tube 44 may be a circular tube with a hollow circular center or another shape. The tube includes a wall 46 having an interior surface 54 and an exterior surface 56. The tube 44 may include weld seams 48 that are formed in the wall 46. The weld seams 48 extend longitudinally along the length of the tube 44 and completely through the wall 46. A pip 52 is formed on the interior surface 54 in an extrusion process. The pip 52 runs longitudinally along the length of the tube 44. The opposite end of the tube 44 is identical to the end that is illustrated. The pip 52 may be located between the weld seams 48 or may be located on one of the weld seams. The pip 52 and the weld seams 48 are substantially parallel to each other in a fixed spatial relationship. The pip 52, as shown, is disposed on the interior surface 54 but the pip 52 may be disposed on the exterior surface 56. The pip 52 as shown is enlarged for better visibility in the drawing.

The pip 52 may be a raised portion of the wall 46 as is shown in FIG. 1B. The raised pip 52 may be a ridge formed into the wall 46. The ridge may be formed by a recessed marking element or other suitable tooling. For example, the marking element may be a groove machined into the inner diameter of an extrusion die so that during extrusion, aluminum is forced into the groove to form the ridge.

Alternatively, the pip 53 may be a recessed portion or groove in the wall 46 as is shown in FIG. 1C. The groove is formed by a raised marking element. For example, the raised marking element may be a tooth that cuts a groove into the aluminum wall. The pip 53 defines a pair of opposing sidewalls 55 that extend from the interior surface 54 towards the exterior surface 56. A floor 57 of the pip 53 connects between the sidewalls 55.

The structural tubes 44 are formed into a finished part by hydroforming the tube into a desired shape. Prior to hydroforming, the tubes may go through a series of processes such as bending and pre-forming. The weld seams have slightly different material properties than other parts of the tube. Consistent placement of the weld seams is necessary to ensure a consistent finished part in mass production. Damage can occur if the weld seams are not placed in a proper location during processing. For example, the tube can crack, split, or blowout if misaligned in the hydroforming die. Aside from the problem of potential physical part damage, it is very desirable to provide an extruded tube that has consistent properties. Having final parts with different weld seam locations can lead to inconsistent part performance. For example, the weld seam location can affect the strength of the part. To mitigate this issue, the weld seams must be placed in the appropriate position within the manufacturing dies. Unlike steel tubes, that have visible welds, the weld seams on extruded aluminum tubes are almost undetectable with the naked eye and are very difficult to locate.

The pip 52 is a locating feature that allows a person or machine to determine locations of the seam welds without being able to see the seams. The pip and weld seam are formed during extrusion and have a fixed spatial position relative to each other. By knowing the location of the pip, the location of the weld seams can be determined. The location, size, type and shape of the pip may vary. The pip 52 may also be used to measure the amount of twist that occurs during the extrusion process. Different amounts of twist are desired for different extrusion operations. The pip provides a convenient visible indicator that can be monitored during the extrusion process to ensure that desired twist is occurring. The pip may be used to verify the position of the weld seams after forming.

Figure 3:
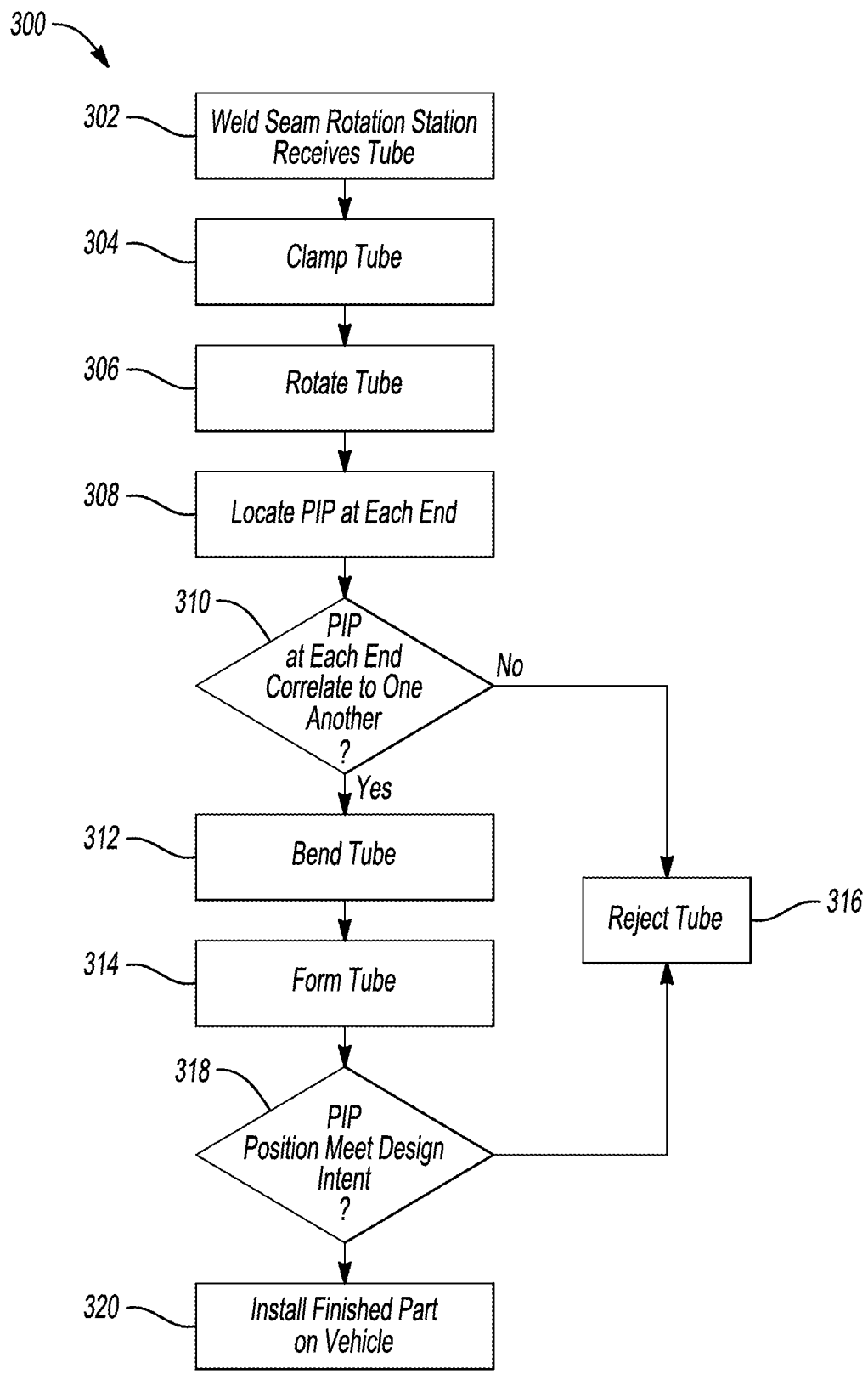
FIG. 3 is a flowchart illustrating one example of a method of forming a porthole extruded alloy tube.

Referring to FIG. 3, a flowchart illustrating one method 300 of tube forming is provided. The method 300 includes detecting the pip 52 and orienting and verifying the position of the weld seams 48 before and after forming. Note the flowchart in FIG. 3 is for illustrative purposes only and that the method 300 should not be construed to be limited to the steps of the flowchart in FIG. 3. Some of the steps of the method 300 may be rearranged while others may be omitted entirely.

Figure 4:
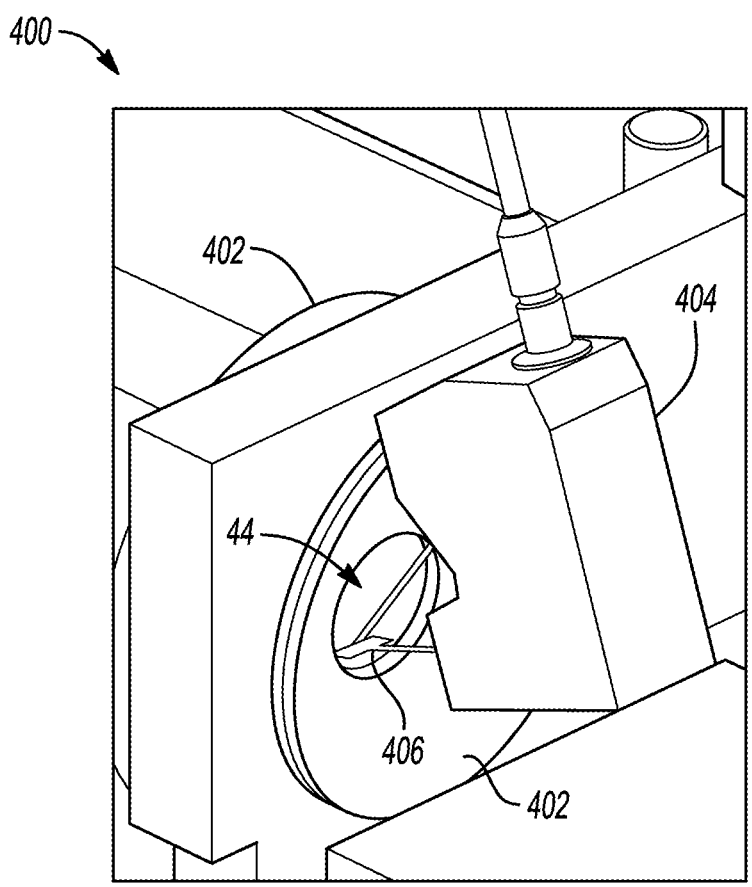
FIG. 4 is a perspective view of directing a laser displacement sensor on an inner periphery of one end of the tube.

The method may include a weld seam rotation station receiving an unformed (e.g., straight) structural tube 44, as represented by operation 302. The weld seam rotation station may receive the tube 44 from a conveyor belt or another suitable apparatus that transfers the tubes between assembly stations. Once received, the tube 44 may nest within a fixture or jig and clamped by pneumatic clamps or other suitable clamping devices 402 (FIG. 4), as represented by operation 304. Once clamped, the tube 44 is rotated, as represented by operation 306. The tube 44 may be rotated by a gear motor driven rotation device 402 that is fixed to the clamps 402 (FIG. 4).

As the tube 44 is rotated, one or more measurements are taken by a first laser displacement sensor 404 (FIG. 4), as represented by operation 308. In one embodiment, the measurement may be a profile or surface profile measurement of the inner periphery or inner surface 54 of the tube 44 is completed. The term profile or surface profile is used to refer to a generally uniform boundary around a surface in which elements of the surface lie. The pip 52 that outwardly extends from the inner surface 54 by a height $H_1$ extends outside of the generally uniform boundary. Similarly, the pip 53 is recessed with respect to the inner surface 54 by a depth of $H_2$ extends outside of the generally uniform boundary (in the opposite direction). In another embodiment, when either of the pips 52 or 53 are disposed on the outer surface 56, the surface profile of the outer surface 56 is measured.

Operation 308 further includes logging or recording the positional locations of the pip 52 on each end for correlation. If there is no correlation between the pips 52 at each end of the tube 44, the tube may be rejected, as represented by operation 316. If there is a correlation between the pips 52 at each end of the tube 44, the tube is transferred to a bending station to bend the tube 44, as represented by operation 312.

In another embodiment, the inner diameter Di may be measured to determine the location of the pip 52. The inner diameter Di is the straight-line distance between the pip 52 and the wall 54. The inner diameter Di is measured for each end of the tube 44. The location of the pip 52 may be determined based on the difference between of the inner diameter between the pip 52 and the wall 54 and the inner diameter between two opposing points on the wall 54.

The tube 44 may then be formed by a hydroforming process, as represented by operation 316. Once the tube 44 is formed, it is transferred to a secondary pip position verification station 500. In the secondary pip position verification station, at least one end of the tube 44 is clamped or secured by pneumatic clamps or other suitable clamping devices 402 (FIG. 5A) and a second laser displacement sensor 404 measures the profile of the inner periphery or inner surface 54 at one end of the formed tube. The term "profile" or "surface profile" is used to refer to a generally uniform boundary around a surface in which elements of the surface lie. The pip 52 that outwardly extends from the inner surface 54 by a height $H_2$ extends outside of the generally uniform boundary. Similarly, the pip 53 that is recessed with respect to the inner surface 54 by a depth of $H_2$ extends outside of the generally uniform boundary (in the opposite direction). In another embodiment, when either of the pips 52 or 53 are disposed on the outer surface 56, the surface profile of the outer surface 56 is measured. In another embodiment, the location of the pip 52 may be derived based on the measurements of the inner diameter. The location of the pip 52 may then be compared to a positional location of a pip of the intended design and an associated tolerance band, as represented by operation 318. If the location of the pip 52 does not meet the intended design position, the tube 44 is then rejected, as represented by operation 316. If the location of the pip 52 meets the intended design position, it is released and installed on a vehicle, as represented by operation 320.

Referring to FIG. 4, measurement of one end of the tube 44 as outlined in the description of operation 308 above, is shown. A portion of the assembly equipment 400 includes the clamp 402 that nests and clamps the tube 44. As the tube 44 is rotated, the laser displacement sensor 404 projects a laser 406 on the inner surface 54 of the tube 44. The laser displacement sensor may be an "Ultra-High-Speed/High-Accuracy Laser Displacement Sensor" produced and sold by Keyence® or another suitable laser displacement sensor.

Figure 5A:
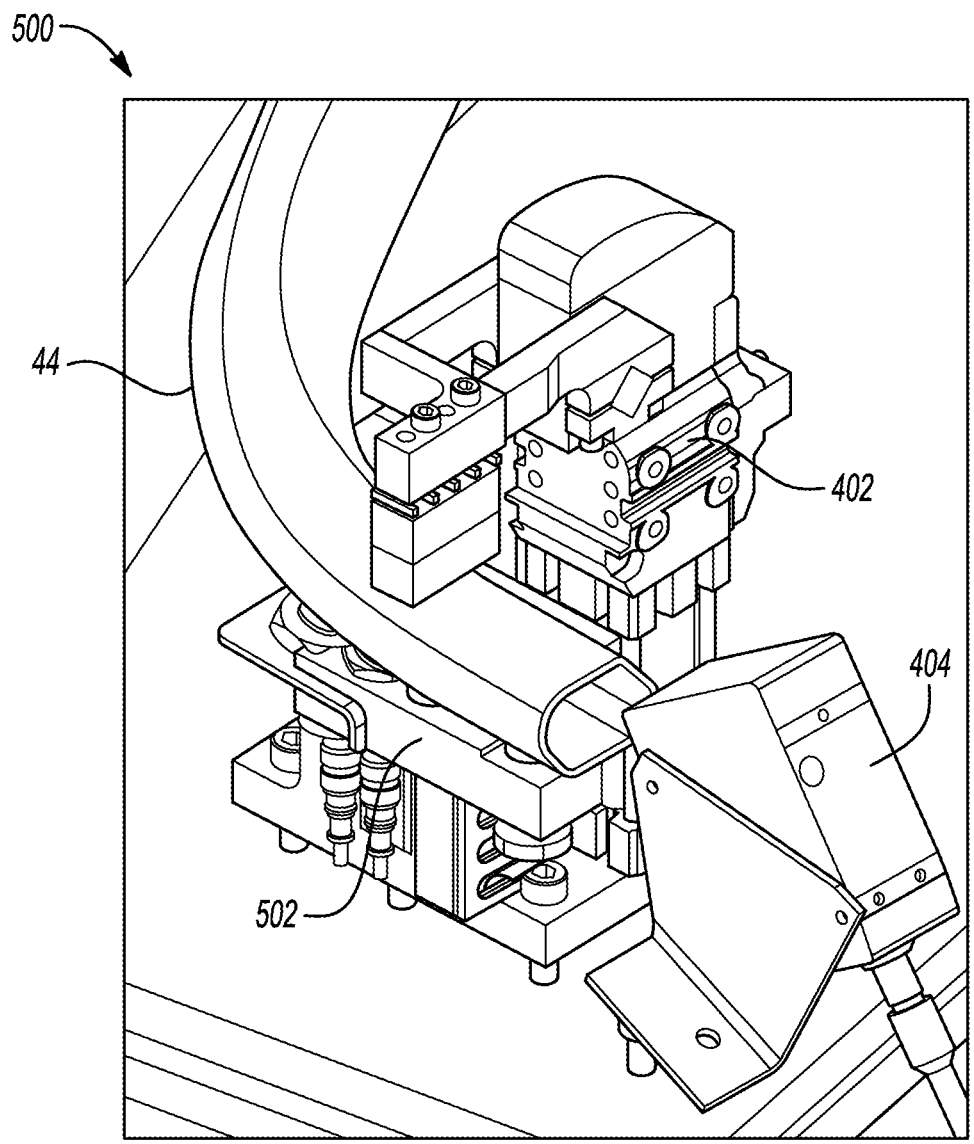
FIG. 5A is a detailed perspective view of clamping and directing a laser displacement sensor towards an inner periphery of a formed tube.

Referring to FIG. 5 and FIG. 5A, one example of executing operation 318 is provided. Formed tubes 44 are carried along the conveyor 410 in alternating pattern: every other tube 44 is positioned closest to one side of the conveyor and the other tubes 44 are positioned closest to the other side. Each side of the conveyor includes a verification station 500 that measures the inner periphery or inner diameter of one end of the formed tube 44. The verification station 500 includes a fixture 502 and a clamp 402. The formed tube 44 is sandwiched between the clamp 402 and the fixture 502. The laser displacement sensor 404 projects a laser on the inner surface 54 of the tube 44 to determine the position of the pip 52. The measured position of the pip 52 may then be compared to a known or design intent position by a computing device (e.g., programmable logic device).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of hydroforming an extruded circular tube comprising:
    measuring an inner periphery of first and second ends of the tube to identify first and second circumferential positions of a pip disposed on a wall at each end of the tube, wherein the pip is a recessed channel defined by and extending along a length of the wall, wherein first and second circumferential positions are measured on the inner periphery of the first and second ends of the tube by directing a laser-displacement sensor to the inner periphery of the first and second ends of the tube;
    comparing a positional difference between the first and second circumferential positions against a predetermined threshold
    deforming the tube to produce a formed tube;
    remeasuring a surface profile of an inner periphery on at least one end of the formed tube to locate a circumferential position of the pip at the at least one end of the tube; and
    comparing a positional difference between the circumferential position of the pip at the at least one end of the formed tube and a predetermined circumferential position against a predetermined-upper threshold and a predetermined-lower threshold-.

2. The method of claim 1 further comprising:
    aligning the tube in a bending tool to place weld seams, circumferentially spaced from the pip, in a predetermined location relative to a bending tool.

3. The method of claim 1 wherein measuring the inner periphery of the first and second ends of the tube includes rotating the tube while applying the laser-displacement sensor to the inner periphery of the first and second ends of the tube.

4. The method of claim 3 wherein measuring the inner periphery of the first and second ends of the tube includes measuring a surface profile of the inner periphery.

5. A method of hydroforming an extruded circular tube comprising:
    measuring an inner periphery of first and second ends of the tube to identify first and second circumferential positions of a pip disposed on a wall at each end of the tube, wherein the pip is a recessed channel defined by and extending along a length of the wall;
    comparing a positional difference between the first and second circumferential positions against a predetermined threshold
    deforming the tube to produce a formed tube;
    remeasuring a surface profile of an inner periphery on at least one end of the formed tube to locate a circumferential position of the pip at the at least one end of the tube; and
    comparing a positional difference between the circumferential position of the pip at the at least one end of the formed tube and a predetermined circumferential position against a predetermined-upper threshold and a predetermined-lower threshold.

* * * * *